United States Patent
Durand et al.

[11] Patent Number: 5,882,460
[45] Date of Patent: Mar. 16, 1999

[54] METHOD FOR MANUFACTURING VEHICLE FRAME COMPONENTS USING COMPOSITE FIBER PULTRUSION TECHNIQUES

[75] Inventors: Robert D. Durand, Wyomissing Berks; Michael F. Miller, West Lawn, both of Pa.

[73] Assignee: Dana Corporation, Toledo, Ohio

[21] Appl. No.: 924,632

[22] Filed: Sep. 5, 1997

Related U.S. Application Data

[63] Continuation of Ser. No. 493,302, Jun. 21, 1995, abandoned.

[51] Int. Cl.$^6$ .............................. B32B 31/00; B62D 21/12
[52] U.S. Cl. .......................... 156/166; 156/180; 156/242; 264/137; 188/377; 280/785
[58] Field of Search ...................................... 156/166, 180, 156/433, 441, 242, 245; 264/137, 136, 257, 258; 188/3.77; 280/781, 785

[56] References Cited

U.S. PATENT DOCUMENTS

| | | |
|---|---|---|
| 4,412,615 | 11/1983 | Forshee . |
| 4,431,221 | 2/1984 | Jahnle . |
| 4,445,957 | 5/1984 | Harvey ..................................... 156/180 |
| 4,573,707 | 3/1986 | Pabst . |
| 4,625,995 | 12/1986 | Aubry et al. . |
| 4,718,693 | 1/1988 | Booher . |
| 4,742,899 | 5/1988 | Thornton . |
| 4,753,456 | 6/1988 | Booher . |
| 4,765,576 | 8/1988 | Peled . |

(List continued on next page.)

FOREIGN PATENT DOCUMENTS

| | | |
|---|---|---|
| 2504449 | 10/1982 | France . |
| 2081638 | 2/1982 | United Kingdom . |
| 2144683 | 3/1985 | United Kingdom . |
| 2280951 | 2/1995 | United Kingdom . |
| 92/12320 | 7/1992 | WIPO . |

OTHER PUBLICATIONS

El–Zein, M.S., et al, "Design and Evaluation of Rollover Protective Structures Using Pultruded Members," SPI Composite Institute's 48th Annual Conference, Conference Proceedings, Feb. 8–11, 1993, Paper 2–C.

Martin, J.D., et al, "Pultrusion", Engineered Materials Handbook, vol. 1, Composites, 1989, pp. 533–543.

(List continued on next page.)

*Primary Examiner*—Jeff H. Aftergut
*Attorney, Agent, or Firm*—MacMillan, Sobanski & Todd, LLC

[57] ABSTRACT

An apparatus for manufacturing vehicle frame components using composite fiber pultrusion techniques includes one or more sources of a fibrous material. A bath or similar structure is provided for applying a resin material to the fibrous materials from the sources. Following the application of the resin, the fibrous materials are then pulled through a die. The die is formed having an opening therethrough which corresponds in shape to the desired cross sectional shape of the vehicle frame component to be manufactured. As the fibrous materials are pulled through the die, they conform to the shape of the opening formed therethrough. Because of the resin applied thereto, the fibrous materials adhere to one another to form a pultrusion which retains the shape of the opening formed through the die. The formed pultrusion is then pulled through a curing oven which heats the resin to a predetermined curing temperature, causing it to harden a rigid condition. As a result, the pultrusion as a whole acquires a desired rigidity. Movement of the fibrous materials and of the pultrusion is effected by means of a pulling device. Following passage through the pulling device, the pultrusion is cut to desired lengths by a conventional cutting machine. Additionally, openings of desired sizes and shapes may be formed in the pultrusion by a convention perforation machine. Pultrusions of different shapes and sizes may be used to form side rails which are permanently joined together by transversely extending cross members by adhesive to form the vehicle frame component.

14 Claims, 1 Drawing Sheet

U.S. PATENT DOCUMENTS

| | | |
|---|---|---|
| 4,767,134 | 8/1988 | Booher . |
| 4,772,044 | 9/1988 | Booher . |
| 5,129,672 | 7/1992 | Hiromoto et al. . |
| 5,195,779 | 3/1993 | Aoyama et al. . |
| 5,205,587 | 4/1993 | Orr . |
| 5,322,582 | 6/1994 | Davies et al. .......................... 156/180 |
| 5,354,114 | 10/1994 | Kelman et al. . |
| 5,374,385 | 12/1994 | Binse et al. . |
| 5,397,272 | 3/1995 | Smiley et al. . |
| 5,449,081 | 9/1995 | Sjostedt et al. . |
| 5,476,704 | 12/1995 | Kohler . |
| 5,527,404 | 6/1996 | Warren . |

OTHER PUBLICATIONS

El–Zein, Mohamad, et al, "Design and Evaluation of Rollover Protective Structure Using Pultruded Members," SPI Composite Institute's 48th Annual Conference, Composites Institute, The Society of the Plastics Industry, Feb. 8–11, 1993, pp. 2–C, 1–4.

Farley, G.L., et al, "Crushing Characteristics of Composite Tubes With Near–Elliptical ' Cross Sections,"Journal of Composite Materials, vol. 26, No. 12, 1992, pp. 1741–1751.

Czaplicki, M.J., et al, "Non–axial crushing of E–glass/polyester pultruded tubes" Journal of Composite Materials, vol. 24, Oct. 1990, pp. 1077–1100.

Modern Plastics International, pp. 34–36, Aug. 1992.

5,882,460

METHOD FOR MANUFACTURING VEHICLE FRAME COMPONENTS USING COMPOSITE FIBER PULTRUSION TECHNIQUES

This application is a continuation of application Ser. No. 08/493,302, filed Jun. 21, 1995, now abandoned.

BACKGROUND OF THE INVENTION

This invention relates in general to the manufacture and assembly of vehicle frame components and in particular to a method and apparatus for manufacturing vehicle frame components using composite fiber pultrusion techniques.

Virtually all land vehicles in common use, such as automobiles and trucks, include a frame which serves as a platform upon which the remainder of the vehicle is built. Many vehicle frame structures are known in the art. Most of these known vehicle frame structures are formed from a number of individual metallic components which are permanently joined together. For example, a typical vehicle frame is composed of a pair of longitudinally extending side rails which are joined together by a plurality of transversely extending cross members. In shorter length vehicles, the side rails can be formed from a single piece of metal. In longer vehicles, however, each of the side rails is usually formed from two or more side rail sections which are permanently joined together. In either event, the side rails and cross members, once joined together, form a frame for supporting the remaining portions of the vehicle thereon. To facilitate the attachment of the other portions of the vehicle to the vehicle frame, a variety of brackets, hangers, cradles, and the like are often joined to the side rails and cross members at desired locations. It is common practice to also form these supporting hardware components from metallic materials, and further to permanently join them to the side rails and cross members at desired locations. Conventional welding techniques have been commonly used to permanently join the various components of the vehicle frame together.

Although the use of metallic materials to form vehicle frame components and the process of welding such metallic vehicle frame components together have been performed with satisfactory results in the past, some drawbacks thereto have been noted. First, traditional metallic materials which have been used in the past, such as steel, are relatively heavy and, therefore, contribute undesirably to the overall weight of the vehicle. Second, conventional welding techniques involve the application of heat to localized areas of the two metallic frame members, which can cause undesirable weaknesses to be introduced into the metallic components. Although the use of non-traditional, lighter weight metallic materials, such as aluminum, has been proposed, such use presents other challenges, including increased cost and difficulty in permanent joinder. Inasmuch as the production of vehicle frames is usually an high volume, low margin process, it would be desirable to provide an improved method and apparatus for manufacturing vehicle frame components which avoids these problems.

SUMMARY OF THE INVENTION

This invention relates to a method and apparatus for manufacturing vehicle frame components using composite fiber pultrusion techniques. The apparatus includes one or more sources of a fibrous material. A bath or similar structure is provided for applying a resin material to the fibrous materials from the sources. Following the application of the resin, the fibrous materials are then pulled through a die. The die is formed having an opening therethrough which corresponds in shape to the desired cross sectional shape of the vehicle frame component to be manufactured. As the fibrous materials are pulled through the die, they conform to the shape of the opening formed therethrough. Because of the resin applied thereto, the fibrous materials adhere to one another to form a pultrusion which retains the shape of the opening formed through the die. The formed pultrusion is then pulled through a curing oven which heats the resin to a predetermined curing temperature, causing it to harden a rigid condition. As a result, the pultrusion as a whole acquires a desired rigidity. Movement of the fibrous materials and of the pultrusion is effected by means of a pulling device. Following passage through the pulling device, the pultrusion is cut to desired lengths by a conventional cutting machine. Additionally, openings of desired sizes and shapes may be formed in the pultrusion by a convention perforation machine. Pultrusions of different shapes and sizes may be used to form side rails which are permanently joined together by transversely extending cross members by adhesive to form the vehicle frame component.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
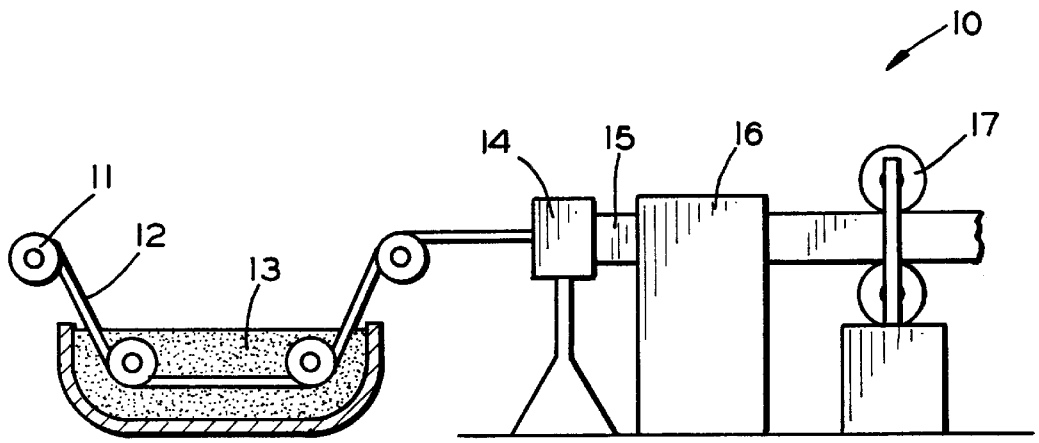
FIG. 1 is a schematic elevational view of an apparatus for continuously pultruding composite fibers for manufacturing vehicle frame components in accordance with this invention.

Referring now to the drawings, there is schematically illustrated in FIG. 1 an apparatus, indicated generally at 10, for continuously pultruding composite fibers for manufacturing vehicle frame components in accordance with this invention. The apparatus 10 includes one or more sources 11 of a fibrous material 12. Typically, each source 11 of the fibrous materials 12 is embodied as a spool having the fibrous material wound thereon. The source of fibrous materials 10 may supply either a plurality of strands of the same material, or it may provide a plurality of strands of different materials. For example, aramid fibrous material may be used to provide impact resistance and high tensile strength. Graphite fibrous material may be used to provide high stiffness. Glass fibrous material may be used as a general filler. The selection of the specific materials will vary with the specific application for the vehicle frame component to be manufactured.

Figure 2:
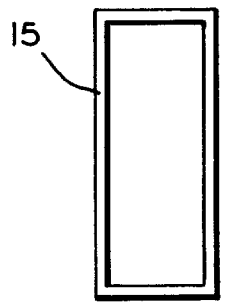
FIG. 2 is a sectional elevational view of a pultrusion formed by the apparatus illustrated in FIG. 1.

Means are provided for applying a resin material to the fibrous materials 12 from the sources 11. In the illustrated embodiment, the fibrous materials 12 from the sources 11 are passed through a resin bath 13. The resin is applied to the fibrous materials 12 so as to cause them to adhere to each other. However, other known structures may be used to apply the resin thereto. Following the application of the resin, the fibrous materials 12 are then pulled through a die 14. The die 14 is formed having an opening therethrough which corresponds in shape to the desired cross sectional shape of the vehicle frame component to be manufactured. As the fibrous materials 12 are pulled through the die 14, they conform to the shape of the opening formed therethrough. Because of the resin applied thereto, the fibrous materials 12 adhere to one another to form a pultrusion 15 which retains the shape of the opening formed through the die 14, as shown in FIG. 2. The formed pultrusion 15 is then pulled through a curing oven 16. The curing oven 16 is conventional in the art and is designed to heat the resin applied to the fibrous material 12 to a predetermined curing temperature, causing it to harden a rigid condition. As a result, the pultrusion 15 as a whole acquires a desired rigidity.

Referring back to FIG. 1, it can be seen that movement of the fibrous materials 12 and of the pultrusion 15 is effected by means of a pulling device 17. The pulling device 17 is conventional in the art and can be embodied as any known machine for drawing the fibrous materials 12 through the adhesive bath 13 and the die 14 to form the pultrusion 15. Following passage through the pulling device 17, the pultrusion 15 is cut to desired lengths by a conventional cutting machine (not shown). Additionally, openings of desired sizes and shapes may be formed in the pultrusion by a convention perforation machine (not shown).

The illustrated pultrusion 15 is generally hollow and rectangular in cross sectional shape, having uniform thickness side walls. However, the pultrusion 15 may be formed in any desired cross sectional shape, including cylindrical, square, and oval. Furthermore, it is not necessary that the pultrusion 15 be formed having a closed cross sectional shape. For example, the pultrusion 15 may be formed C-shaped or I-shaped in cross section.

Figure 3:
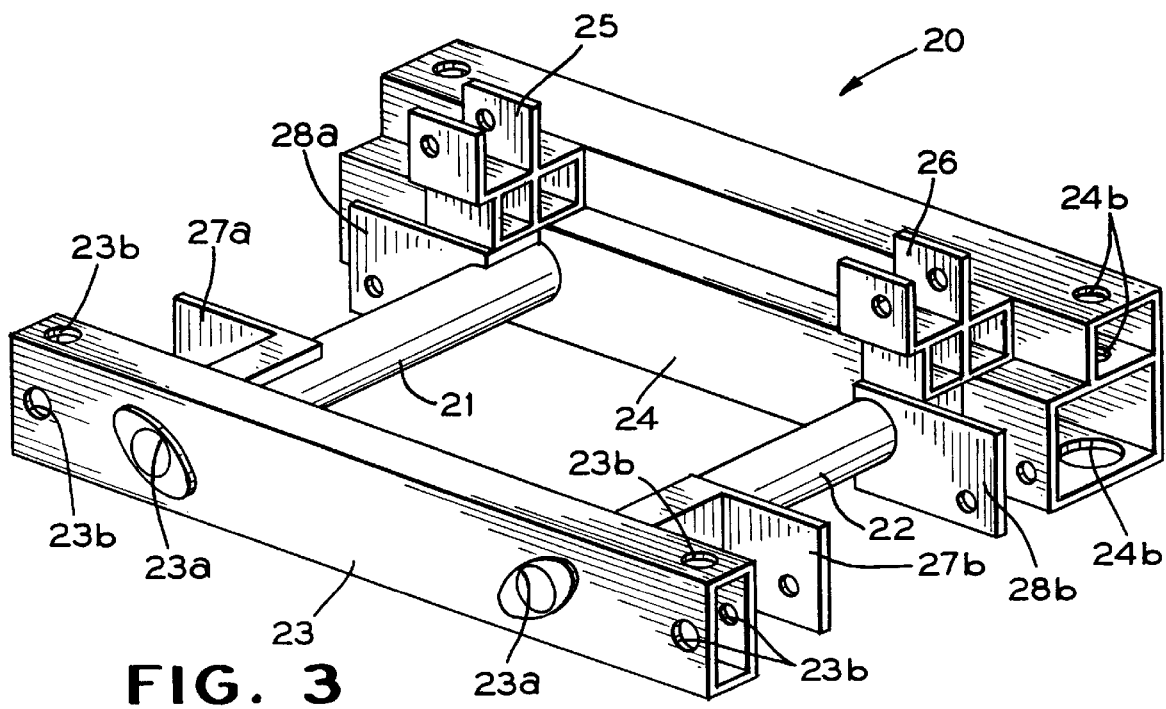
FIG. 3 is a perspective view of a vehicle frame component manufactured in accordance with this invention.

Referring now to FIG. 3, there is illustrated a vehicle frame component, indicated generally at 20, which has been manufactured in accordance with this invention. The illustrated vehicle frame component 20 is a rear cradle assembly for a truck, which is adapted to support an engine, differential, suspension arm, or similar component of the vehicle. However, the apparatus and method of this invention may be practiced so as to manufacture any other vehicle frame component. The illustrated vehicle frame component 20 includes a pair of side rails 21 and 22. The side rails 21 and 22 may, if desired, be formed having such a length as to extend longitudinally throughout the length of the vehicle in which it is to be used. Alternatively, as shown in FIG. 3, the side rails 21 and 22 may represent only individual sections of a longer side rail (not shown). For example, each of the overall side rails may be formed from three individual side rail sections which are joined together in a manner described further below. Each of the illustrated side rails 21 and 22 is hollow, having an outer surface which is generally oval or elliptical in cross sectional shape and an inner surface which is generally circular in cross sectional shape. However, the side rails 21 and 22 may be formed having any desired cross sectional shape in accordance with the pultrusion process described above.

The side rails 21 and 22 are joined together by a plurality of transversely extending cross members 23 and 24. The front cross member 23 is generally hollow and rectangular in shape, similar to the pultrusion 15 discussed above. A pair of oval shaped openings 23a are formed through the forwardly and rearwardly facing walls of the front cross member 23 by a conventional perforating machine. As shown in FIG. 3, the oval shaped openings 23a are sized and positioned to receive the forward ends of the side rails 21 and 22 therein. Because of the non-circular cross sectional shapes of the outer surfaces of the side rails 21 and 22 and of the openings 23a, it will be appreciated that the side rails 21 and 22 are mechanically supported within the front cross member 23 in such a manner as to prevent relative rotation therebetween. Other openings 23b are also formed through the front cross member 23. These openings 23b are provided to facilitate the connections between the front cross member 23 and other components of the vehicle (not shown).

The rear cross member 24 is more complex in design, having an upper hollow rectangular portion and a lower hollow rectangular portion. A pair of oval shaped openings (not shown) are formed through the forwardly and rearwardly facing walls of the rear cross member 24 by a conventional perforating machine. The oval shaped openings are sized and positioned to receive the rearward ends of the side rails 21 and 22 therein. Because of the non-circular cross sectional shapes of the outer surfaces of the side rails 21 and 22 and of the openings 23a, it will be appreciated that the side rails 21 and 22 are mechanically supported within the front cross member 23 in such a manner as to prevent relative rotation therebetween. Other openings 24b are also formed through the rear cross member 24 to facilitate the connections between the front cross member 24 and other components of the vehicle (not shown).

The front and rear cross members 23 and 24 are preferably permanently secured to the side rails 21 and 22. This can be accomplished by use of an adhesive material. The adhesive may be embodied as a conventional resin, such as a polyester resin or an epoxy resin. Alternatively, the adhesive may be embodied as an induction cured adhesive or an electromagnetically sensitive adhesive. The use of these latter adhesives can simplify the application and curing process. If used, an separate curing apparatus (not shown) is provided for curing the adhesive after application.

Referring back to FIG. 3, it can be seen that the rear cradle assembly 20 further includes a pair of upper brackets 25 and 26. The upper brackets 25 and 26 can also be formed in accordance with the pultrusion process described above, cut to desired lengths, and perforated as necessary. The illustrated upper brackets 25 and 26 are mounted on the rear cross member 24 and are permanently secured thereto by an adhesive, as discussed above. Also, the rear cradle assembly 20 further a plurality of side brackets 27a, 27b, 28a, and 28b. The side brackets 27a, 27b, 28a, and 28b are generally L-shaped and can be formed by a conventional pre-impregnated molding process, as opposed to the above-described pultrusion process. The side brackets 27a, 27b, 28a, and 28b perforated as necessary, mounted on the front and rear cross members 23 and 24, and be permanently secured thereto by an adhesive, as discussed above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of manufacturing a vehicle frame assembly comprising the steps of:
   (a) forming a first side rail by (1) supplying a fibrous material, (2) applying a resin material to the fibrous material, (3) pulling the fibrous material through a die having an opening formed therethrough which cone-sponds in shape to a desired cross sectional shape for the first side rail, and (4) curing the resin to a rigid condition to form the first side rail;
   (b) providing a second side rail;
   (c) providing a first cross member;
   (d) providing a second cross member; and (e) connecting the first and second side rails with the first and second cross members to manufacture the vehicle frame assembly.

2. The method defined in claim 1 wherein said step (b) is performed by (1) supplying a fibrous material, (2) applying a resin material to the fibrous material, (3) pulling the fibrous material through a die having an opening formed therethrough which corresponds in shape to a desired cross sectional shape for the second side rail, and (4) curing the resin to a rigid condition to form the second side rail.

3. The method defined in claim 1 wherein said step (c) is performed by (1) supplying a fibrous material, (2) applying a resin material to the fibrous material, (3) pulling the fibrous material through a die having an opening formed therethrough which corresponds in shape to a desired cross sectional shape for the first cross member, and (4) curing the resin to a rigid condition to form the first cross member.

4. The method defined in claim 1 wherein said step (c) is performed by (1) supplying a fibrous material, (2) applying a resin material to the fibrous material, (3) pulling the fibrous material through a die having an opening formed therethrough which corresponds in shape to a desired cross sectional shape for the first cross member, and (4) curing the resin to a rigid condition to form the first cross member, and wherein said step (d) is performed by (1) supplying a fibrous material, (2) applying a resin material to the fibrous material, (3) pulling the fibrous material through a die having an opening formed therethrough which corresponds in shape to a desired cross sectional shape for the second cross member, and (4) curing the resin to a rigid condition to form the second cross member.

5. The method defined in claim 1 wherein said step (b) is performed by (1) supplying a fibrous material, (2) applying a resin material to the fibrous material, (3) pulling the fibrous material through a die having an opening formed therethrough which corresponds in shape to a desired cross sectional shape for the second side rail, and (4) curing the resin to a rigid condition to form the second side rail, and wherein said step (c) is performed by (1) supplying a fibrous material, (2) applying a resin material to the fibrous material, (3) pulling the fibrous material through a die having an opening formed therethrough which corresponds in shape to a desired cross sectional shape for the first cross member, and (4) curing the resin to a rigid condition to form the first cross member, and wherein said step (d) is performed by (1) supplying a fibrous material, (2) applying a resin material to the fibrous material, (3) pulling the fibrous material through a die having an opening formed therethrough which corresponds in shape to the second cross member, and (4) curing the resin to a rigid condition to form the second cross member.

6. The method defined in claim 1 wherein a plurality of different types of fibrous material are supplied such that different portions of the first side rail are reinforced by different types of fibers.

7. The method defined in claim 1 wherein the fibrous material is pulled through a die having an opening that is shaped to form the first side rail having a generally oval outer surface.

8. The method defined in claim 1 wherein the fibrous material is pulled through a die having an opening that is shaped to form the first side rail having a generally oval outer surface and a generally circular inner surface.

9. A method of manufacturing a vehicle frame assembly comprising the steps of:

(a) providing a first side rail;

(b) providing a second side rail;

(c) forming a first cross member by (1) supplying a fibrous material, (2) applying a resin material to the fibrous material, (3) pulling the fibrous material through a die having an opening formed therethrough which corresponds in shape to a desired cross sectional shape for the first cross member, and (4) curing the resin to a rigid condition to form the first cross member;

(d) providing a second cross member; and (e) connecting the first and second side rails with the first and second cross members to manufacture the vehicle frame assembly.

10. The method defined in claim 9 wherein said step (d) is performed by (1) supplying a fibrous material, (2) applying a resin material to the fibrous material, (3) pulling the fibrous material through a die having an opening formed therethrough which corresponds in shape to a desired cross sectional shape for the second cross member, and (4) curing the resin to a rigid condition to form the second cross member.

11. The method defined in claim 9 wherein a plurality of different types of fibrous material are supplied such that different portions of the first cross member are reinforced by different types of fibers.

12. The method defined in claim 9 wherein the fibrous material is pulled through a die having an opening that is shaped to form the first cross member having a hollow, generally rectangular outer surface.

13. The method defined in claim 9 wherein the fibrous material is pulled through a die having an opening that is shaped to form the first cross member having a hollow, generally rectangular first portion and a hollow, generally rectangular second portion.

14. The method defined in claim 9 including the additional step of forming a plurality of openings in the first cross member.

* * * * *